United States Patent [19]

Rigler et al.

[11] 4,286,071

[45] Aug. 25, 1981

[54] SELF-EXTINGUISHING FINE PARTICULATE EXPANDABLE STYRENE POLYMERS

[75] Inventors: Josef K. Rigler, Recklinghausen; Hans-Josef Ratajczak, Marl; Horst Leithäuser, Marl; Karl Trukenbrod, Marl, all of Fed. Rep. of Germany

[73] Assignee: Chemische Werke Hüls AG, Marl, Fed. Rep. of Germany

[21] Appl. No.: 116,842

[22] Filed: Jan. 30, 1980

[30] Foreign Application Priority Data

Feb. 19, 1979 [DE] Fed. Rep. of Germany ....... 2906336

[51] Int. Cl.$^3$ ................................................ C08J 9/14
[52] U.S. Cl. ................................ 521/96; 260/45.7 R; 260/DIG. 24; 521/98; 521/146; 521/907
[58] Field of Search ................... 260/45.7 R, 45.7 RL; 521/96, 98

[56] References Cited

U.S. PATENT DOCUMENTS

| | | | |
|---|---|---|---|
| 3,058,928 | 10/1962 | Eichhorn et al. | 521/907 |
| 3,058,929 | 10/1962 | Vanderhoff et al. | 521/907 |
| 3,457,204 | 7/1969 | Burger et al. | 521/139 |
| 3,472,799 | 10/1969 | Burger et al. | 260/45.7 RL |

*Primary Examiner*—Morton Foelak
*Attorney, Agent, or Firm*—Gilbert L. Wells

[57] ABSTRACT

Self-extinguishing, fine particulate, expandable styrene polymers for the manufacture of molded articles, containing bromine compounds and one synergist. The synergist, referred to the styrene polymer, is at least one hydrocarbon present in amounts from about 0.1 to 3% by weight and forms stable radicals at temperatures above 300° C.

9 Claims, No Drawings

SELF-EXTINGUISHING FINE PARTICULATE EXPANDABLE STYRENE POLYMERS

CROSS-REFERENCE TO A RELATED APPLICATION

Applicants claim priority under 35 USC 119 for application P 29 06 336.3, filed Feb. 19, 1979 in the Patent Office of the Federal Republic of Germany.

BACKGROUND OF THE INVENTION

The field of the invention is self-extinguishing, fine particulate, expandable styrene polymers for the preparation of molded articles. The present invention is particularly concerned with expandable, particulate molding compositions of styrene polymers containing organic halogen compounds and a synergist as flame proofing agents.

The state of the art of expandable polystyrene may be ascertained by reference to the Kirk-Othmer, "encyclopedia of Chemical Technology," 2nd Edition, Vol. 9 (1966) under the section entitled "Foamed Plastics," pages 847–884, particularly pages 852, 853 and 855 where polystyrene is disclosed, and Vol. 19 (1969) under the section entitled "Styrene Plastics," pages 85–134, particularly pages 116–120, where polystyrene foams are disclosed and pages 120, 121 where prior art self-extinguishing polystyrene foams are disclosed in U.S. Pat. Nos. 3,058,926; 3,058,927; 3,274,133; 3,389,097; 3,457,204; 3,789,028; 3,897,373 and 3,972,843; the disclosures of which are incorporated herein.

The disclosure of assignee's U.S. Pat. No. 2,954,412 is incorporated herein to show the preparation of dibenzylbenzene starting materials useful in the present invention.

U.S. Pat. No. 3,972,843 discloses methods, useful in the present invention, for producing particulate molding compositions for the production of foamed articles by polymerizing styrene in aqueous suspension.

It is known to use halogenated materials, especially organic bromine compounds, as flame proofing substances for self-extinguishing thermoplastic polmers. To achieve a sufficient effect, relatively large amounts of the halogenated compounds must be added. This adversely affects the processing properties especially as regards expandable polymers.

Further, it is known that the amount of the halogenated compound needed to keep the effect constant can be decreased by adding synergistic substances. The following particular synergists are known: organic peroxide compounds such as disclosed in U.S. Pat. Nos. 3,058,926 and 3,058,927 and diazo compounds such as disclosed in U.S. Pat. No. 3,897,373. Both organic peroxides and diazo compounds suffer from the drawback that they, as well as their dissociation products are highly toxic in the high concentrations required and that on occasion they decompose explosively.

The use of polymers and oligomers of p-diisopropylbenzene as synergists for brominated fireproofing agents as disclosed in U.S. Pat. No. 3,457,204, French Pat. No. 14 57 547 and Belgian Pat. No. 704,666 suffers from the drawback that these polymers and oligomers are insoluble in styrene and furthermore, they are present in the solid aggregate state, whereby it is difficult to introduce them into expandable styrene polymers. Furthermore, as regards a good effect, concentrations exceeding 1% by weight are required.

The use of the N-nitroso compounds as disclosed in U.S. Pat. No. 3,274,133, of triphenylphosphine oxide as disclosed in French Pat. No. 14 10 556 or of tetraphenylhydrazine, as disclosed in French Pat. No. 12 45 593 is prohibited in practice because these materials or their decomposition products are toxic.

SUMMARY OF THE INVENTION

Having in mind the limitations of the prior art, it is an object of the present invention to prepare molded articles from fine particulate, selfextinguishing, expandable styrene polymer molding compositions containing organic bromine compounds as flame proofing agents and an improved synergist. The synergist of the present invention is used in a concentration of 0.1 to 3% by weight referred to the styrene polymer and consists of at least one hydrocarbon which forms stable radicals at temperatures above 300° C. The organic bromine compound has more than 40% by weight bromine and sufficient bromine compound is used to provide at least 0.1% but no more than 2% by weight bromine based on the weight of styrene polymer.

By "hydrocarbon which forms stable radicals at temperatures about 300° C." is meant, the c-c-linkages of said hydrocarbon are labile. The bonding strength is strong enough that the c-c bond does not decompose under polymerization—or molding temperatures but low enough not to form radicals before fire temperatures are reached (above 300° C.).

DESCRIPTION OF THE PREFERRED EMBODIMENTS

Suitable hydrocarbons which form stable radicals at temperatures about 300° C. are dibenzylbenzenes of the general formula

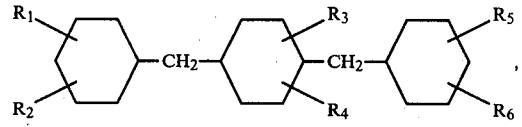

where $R_1$ through $R_6$ represent hydrogen or halogen atoms, alkyl, cycloalkyl or aryl groups. The dibenzylbenzenes are obtained by the method disclosed in U.S. Pat. No. 2,954,412. As a rule, the dibenzylbenzenes represent mixtures of isomers which are useful in that form. Further suitable hydrocarbons which form stable radicals at temperatures above 300° C. include, but are not limited to, benzyltoluol, also in the form of its isomerous mixture, and especially 1-phenyl-1,3,3-trimethylindane, which is easily obtained through catalytic dimerization of alpha-methylstyrene. Generally speaking, the useful hydrocarbons contain at least one aromatic group.

The synergistic effect of the hydrocarbons which form stable radicals at temperatures above 300° C. can be improved if additionally from about 0.01 to 0.08% by weight of organic peroxides, referred to the weight of styrene polymers, are used where the organic peroxides have a half value time of dissociation exceeding two hours at 100° C. Examples of these peroxides include, but are not limited to: di-tert.-butylperoxide, dicumylperoxide, di-tert.-amylperoxide or 3,3,6,6,9,9-hexamethyl-1,2,4,5-tetraoxacyclononane, where dicumylperoxide is especially preferred.

It is especially advantageous that the hydrocarbons of the invention be present in amounts from about 0.4 to 1% by weight and the peroxides in amounts from about 0.04 to 0.06% by weight, all referred to the weight of styrene polymer.

Accordingly, the peroxides are useful in very slight proportions, in which as such, they evidence no synergistic effect, and whereby the known drawbacks of their application is averted.

Both the hydrocarbons and the peroxides are soluble in styrene monomer and do not decompose under the conventional conditions of polymerization. Thereby, a homogeneous distribution is assured in the end product. Therefore, the hydrocarbons and peroxides of the invention are advantageously added prior to, or at the beginning of the polymerization. Because of the use of the economical hydrocarbons of the invention, the synergistic effect is not lost even when the polymer end product is stored for extended periods of time at fairly high temperatures.

Polystyrene and copolymers of styrene with up to 50% by weight of comonomers are useful as the styrene polymers. The comonomers include, but are not limited to alpha-methylstyrene, acrylonitrile as well as esters of acrylic acid or methacrylic acid where the esters are of alcohols having 1 to 8 carbon atoms.

The styrene polymers contain one or more expanding agents homogeneously distributed therein. Suitable expanding agents are, for instance under ordinary conditions, gaseous or liquid hydrocarbons or halogen hydrocarbons which do not dissolve the styrene polymer and the boiling point of which is less than the polymer's softening point. Suitable expanding agents include, but are not limited to, propane, butane, pentane, cyclopentane or halogen hydrocarbons such as dichlorodifluoromethane and methylene chloride. Furthermore, the styrene polymers of the invention may contain mixtures of expanding agents. The expanding agents as a rule are contained in the styrene polymers in amounts from about 3 to 15, especially 5 to 8% by weight referred to the weight of styrene polymer.

The bromine compounds, preferably contain at least 4 carbon atoms. Particularly suitable are low-volatility compounds acting only slightly or not at all as plasticizers and free of offensive odors, for instance, 1,2,5,6,9,10-hexabromocyclododecane, ethoxitetrabromooctane, tribromo-trichlorocyclohexane and pentabromomonochlorocyclohexane. A listing of suitable bromine compounds is found in KUNSTSTOFF-HANDBUCH, vol. V, "Polystyrol" (1965), pp. 690. Bromine compounds should contain more than 40% by weight of bromine and are applied in sufficient amounts that the content in bromine is at least 0.1 but no more than 2% by weight referred to the weight of styrene polymer. Preferably, the bromine content is from about 0.4 to 1% by weight.

The styrene polymers of the invention may furthermore contain additives such as plasticizers, dyestuffs and fillers. Furthermore, the expandable polystyrenes may be surface-coated during prefoaming for instance with anti-clumping substances, or against static charging as disclosed in U.S. Pat. Nos. 3,389,097 and 3,789,028.

The expandable styrene polymers are obtained by polymerizing in the presence of organic polymerization initiators which, under the influence of heat, decompose into polymerization triggering radicals. The following substances are typically applicable: peroxides such as benzoylperoxide, laurylperoxide or tert.-butylperbenzoate, tert.-butylperoctoate or mixtures of these, as well as unstable azo compounds such as azobisisobutyronitrile. The initiators as a rule are used in concentrations from about 0.01 to 1% by weight referred to the weight of the monomers.

The type of initiator used depends on the temperature of polymerization being considered. Advantageously mixtures of initiators are used, the temperature of polymerization being adjustable when desired to the corresponding half value time of the initiator. As a rule, the temperature of polymerization lies between about 60° and 150° C., preferably between 80° and 120° C.

The expandable styrene polymers are usually present in the form of beads or in any other useful form, the particles preferably having diameters from about 0.3 to 3 mm.

The self-extinguishing molded articles made from the styrene polymers are tested in the following manner:

One test body 30×30×120 mm in size is clamped vertically into a holder and is made to burn for 5 seconds using a nonluminous bunsen burner flame with a flame height of 40 mm. The flame is then evenly removed. The time of extinction of the molded article following removal from the flame is a measure of its flame-proofing. Molded articles that are insufficiently flame-proofed or not flame-proofed at all burn down completely after the flame is removed.

According to the present invention, the following combinations of styrene polymers/halogenated compounds/hydrocarbon synergists/peroxides produce new and unexpected results where the abbreviations used are:

DBT = dibenzyltoluol isomer mixture
MBT = benzyltoluol isomer mixture
PMI = 1-phenyl-1,3,3-trimethylindane
DCP = dicumylperoxide
HBCD = 1,2,5,6,9,10-hexabromocyclododecane
ETBO = 1-ethoxi-2,3,7,8-tetrabromooctane
DHI = dehydro-oligomer of diisopropylbenzene
HBB = hexabromobutene

| POLYMER from | HALOGENATED COMPOUND in weight % | | HYDROCARBON SYNERGIST in weight % | | PEROXIDE in weight % | |
|---|---|---|---|---|---|---|
| Styrene Monomer | HBCD | 0.75 | DBT | 0.6 | — | — |
| Styrene Monomer | HBCD | 0.75 | DBT | 1.0 | — | — |
| Styrene Monomer | HBCD | 0.75 | PMI | 0.6 | — | — |
| Styrene Monomer | HBCD | 0.75 | MBT | 0.4 | DCP | 0.05 |
| Styrene Monomer | HBCD | 0.75 | PMI | 0.4 | DCP | 0.04 |
| Styrene Monomer | HBCD | 1.0 | DBT | 0.5 | DCP | 0.04 |
| Styrene Monomer | HBCD | 1.0 | PMI | 0.4 | DCP | 0.04 |
| Styrene Monomer | HBCD | 1.0 | PMI | 0.4 | DCP | 0.04 |
| Styrene Monomer | HBCD | 1.0 | DBT | 0.5 | DCP | 0.04 |
| Styrene Monomer | HBCD | 1.0 | MBT | 0.5 | DCP | 0.04 |
| Styrene Monomer | ETBO | 1.0 | DBT | 0.5 | — | — |
| Styrene Monomer | ETBO | 1.0 | PMI | 0.6 | — | — |

-continued

| Ex. | Monomer | Br Compound Type | A-mount % by wt | Synergists hydrocarbon Type | A-mount % by wt | peroxide Type | A-mount % by wt |
|---|---|---|---|---|---|---|---|
| | Styrene Monomer | ETBO | 1.0 | DBT | 0.5 | DCP | 0.04 |
| | Styrene Monomer | ETBO | 1.0 | PMI | 0.4 | DCP | 0.04 |
| | Styrene Monomer | HBB | 0.5 | PMI | 0.6 | — | — |
| | Styrene Monomer | HBB | 0.5 | DBT | 0.6 | — | — |
| | Styrene Monomer | HBB | 0.5 | PMI | 0.4 | DCP | 0.04 |
| | Styrene and acrylo nitrile (90:1) | HBCD HBCD | 0.75 1.0 | PMI DBT | 0.6 0.5 | — DCP | — 0.04 |
| | Styrene and acrylic acid butylester (90:1) | ETBO ETBO | 1.0 1.0 | DBT PMI | 1.0 0.4 | — DCP | — 0.04 |

EXAMPLES a-u

A mixture of 100 parts by weight of tap water, 100 parts by weight of styrene, 0.4 parts by weight of benzoylperoxide, 0.1 part by weight of tert.-butylperbenzoate and the concentration of additives as listed in Table 1 was heated in each example to 90° C. with stirring in a stainless steel pressure proof mixing vessel. After two hours at 90° C., 5 parts by weight of a 2% aqueous solution of polyvinyl alcohol were added. After another two hours at 90° C., 7 parts by weight of pentane were added. Following another hour at 90° C., the mixture was raised to 120° C. and kept at this temperature for 6 hours.

The end of the polymerization cycle was followed by cooling and the bead polymer was separated from the aqueous phase, dried and sifted.

The beads were prefoamed in a continuous mixing prefoamer of the Rauscher type, using flowing steam, to a bulk weight of 15 g/l, then were preliminarily stored for 24 hours and then foamed in a 500 liter block mold of the Rauscher type. The set of 5 test panels 30×30×120 mm was cut out of the finished block and the flame-proofing was determined as indicated above. The results are summarized in Table 1 (concentrations are in % by weight referred to styrene).

TABLE 1

| Ex. | Br Compound Type | A-mount % by wt | Synergists hydrocarbon Type | A-mount % by wt | peroxide Type | A-mount % by wt | Extinction time in seconds |
|---|---|---|---|---|---|---|---|
| a | HBCD | 1 | — | — | — | — | >20[1] |
| b | HBCD | 1 | — | — | DCP | 0.04 | >20[1] |
| c | HBCD | 1 | — | — | DHI | 0.3 | 10 |
| d | HBCD | 1 | — | — | DCP | 0.3 | 4 |
| e | HBCD | 0.75 | DBT | 0.6 | — | — | 10 |
| f | HBCD | 0.75 | DBT | 1.0 | — | — | 8 |
| g | HBCD | 0.75 | PMI | 0.6 | — | — | 10 |
| h | HBCD | 0.75 | MBT | 0.4 | DCP | 0.05 | 2 |
| i | HBCD | 0.75 | PMI | 0.4 | DCP | 0.04 | 1 |
| j | HBCD | 1.0 | DBT | 0.5 | DCP | 0.04 | 0.5 |
| k | HBCD | 1.0 | PMI | 0.4 | DCP | 0.04 | 0.5 |
| l | HBCD | 1.0 | PMI | 0.4 | DCP | 0.04 | 1 |
| m | HBCD | 1.0 | DBT | 0.5 | DCP | 0.04 | 2 |
| n | HBCD | 1.0 | MBT | 0.5 | DCP | 0.04 | 1 |
| o | ETBO | 1.0 | DBT | 1.0 | — | — | 7 |
| p | ETBO | 1.0 | PMI | 0.6 | — | — | 8 |
| q | ETBO | 1.0 | DBT | 0.5 | DCP | 0.04 | 1 |
| r | ETBO | 1.0 | PMI | 0.4 | DCP | 0.04 | 0.5 |
| s | HBB | 0.5 | PMI | 0.6 | — | — | 9 |
| t | HBB | 0.5 | DBT | 0.6 | — | — | 9 |
| u | HBB | 0.5 | PMI | 0.4 | DCP | 0.04 | 1 |

"a" through "d" are comparison examples;
"e" through "n" are examples of the invention
[1]burned down completely

EXAMPLES v and w

Examples a-u are repeated using instead 100 parts by weight of styrene 99 parts by weight of styrene and 1 part by weight of acrylonitrile. The results are summarized in Table 2, A.

EXAMPLES x and y

Examples a-u are repeated using 99 parts by weight of styrene and 1 part by weight of acrylic acid butylester instead 100 parts by weight of styrene. The results are summarized in Table 2, B.

TABLE 2

| Ex. | | Br Compound Type | A-mount % by wt | Synergists hydrocarbon Type | A-mount % by wt | peroxide Type | A-mount % by wt | Extinction time in seconds |
|---|---|---|---|---|---|---|---|---|
| A | v | HBCD | 0.75 | PMI | 0.6 | — | — | 10 |
| | w | HBCD | 1.0 | DBT | 0.5 | DCP | 0.04 | 2 |
| B | x | ETBO | 1.0 | DBT | 1.0 | — | — | 9 |
| | y | ETBO | 1.0 | PMI | 0.4 | DCP | 0.04 | 0.5 |

We claim:

1. In a particulate molding composition for the production of foamed articles consisting essentially of a mixture of a polymerized styrene monomer or styrene monomer in admixture with comonomers, an expanding agent, an organic bromine compound and a synergist, the improvement comprising said synergist, comprising a hydrocarbon soluble in monomeric styrene and forming stable radicals at temperatures above 300° C. in a concentration of about 0.1 to 3% by weight based on said polymerized styrene, said hydrocarbon selected from compounds having the general formula

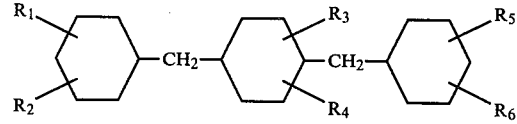

wherein $R_1$ to $R_6$ are hydrogen, halogen, alkyl, cycloalkyl or aryl groups.

2. In a particulate molding composition for the production of foamed articles consisting essentially of a mixture of a polymerized styrene monomer or styrene monomer in admixture with comonomers, an expanding agent, an organic bromine compound and a synergist, the improvement comprising said synergist comprising 1-phenyl-1,3,3-trimethylindane in a concentration of about 0.4 to 1% by weight based on said polymerized styrene and at least one organic peroxide comprising dicumylperoxide in a concentration of said organic peroxide from 0.04 to 0.06% by weight based on said polymerized styrene.

3. In a particulate molding composition for the production of foamed articles consisting essentially of a mixture of a polymerized styrene monomer or styrene monomer in admixture with comonomers, an expanding agent, an organic bromine compound and a synergist, the improvement comprising said synergist comprising a hydrocarbon soluble in monomeric styrene and forming stable radicals at temperatures above 300° C. in a concentration of about 0.1 to 3% by weight based on said polymerized styrene, said hydrocarbon selected from the group consisting of dibenzyltoluol, 1-phenyl-1,3,-trimethylindane and benzyltoluol.

4. The particulate molding composition of claim 3, further comprising from about 0.01 to 0.08% by weight of at least one organic peroxide having a decomposition half value time of more than two hours at 100° C.

5. The particulate molding composition of claim 4, having a concentration of said hydrocarbon from 0.4 to 1% by weight and a concentration of said organic peroxide from 0.04 to 0.06% by weight.

6. The particulate molding composition of claim 5, wherein said bromine compound has more than 40% by weight bromine and bromine of said bromine compound has a concentration of about 0.1 to 2% by weight based on the weight of said styrenes.

7. The particulate molding composition of claim 11, further comprising from about 0.01 to 0.08% by weight of at least one inorganic peroxide having a decomposition half value time of more than two hours at 100° C.

8. The particulate molding composition of claim 7, having a concentration of said hydrocarbon from 0.4 to 1% by weight and a concentration of said organic peroxide from 0.04 to 0.06% by weight.

9. The particulate molding composition of claim 7, wherein said bromine compound has more than 40% by weight bromine and bromine of said bromine compound has a concentration of about 0.1 to 2% by weight based on the weight of said styrenes.

* * * * *